(12) United States Patent
Groset et al.

(10) Patent No.: US 8,975,514 B2
(45) Date of Patent: *Mar. 10, 2015

(54) CABLE ORGANIZATION ASSEMBLIES

(75) Inventors: Erik Groset, Carlsbad, CA (US); Justin Liu, San Diego, CA (US); Michael Klasco, Richmond, CA (US); Robin Defay, Poway, CA (US)

(73) Assignee: Zipbuds, LLC., San Diego, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/289,830

(22) Filed: Nov. 4, 2011

(65) Prior Publication Data

US 2012/0045084 A1 Feb. 23, 2012

Related U.S. Application Data

(63) Continuation-in-part of application No. 29/397,922, filed on Jul. 22, 2011, now Pat. No. Des. 652,407, which is a continuation of application No. 12/941,943, filed on Nov. 8, 2010, now Pat. No. 8,455,758.

(60) Provisional application No. 61/292,981, filed on Jan. 7, 2010.

(51) Int. Cl.
    *H01B 11/06* (2006.01)
    *B29C 45/00* (2006.01)
    (Continued)

(52) U.S. Cl.
    CPC ....... *B29C 45/0055* (2013.01); *B29C 45/14573* (2013.01); *H01B 7/292* (2013.01);
    (Continued)

(58) Field of Classification Search
    USPC ............... 174/110 R, 115, 116, 117 R, 117 F, 174/117 FF, 114 S, 112, 36
    See application file for complete search history.

(56) References Cited

U.S. PATENT DOCUMENTS 2,285,083 A * 6/1942 Cover, Sr. ............... 455/90.3
2,313,234 A * 3/1943 Gavitt ..................... 174/120 SR
(Continued)

FOREIGN PATENT DOCUMENTS

CN 201528413 U 7/2010
CN 2022261737 U 5/2012
(Continued)

OTHER PUBLICATIONS

"Zip up your headphones", retrieved from the Internet on Mar. 20, 2012, <http://old.thepostfamily.com/community_posts/567-zip-up-your-headphones>.

(Continued)

*Primary Examiner* — William H Mayo, III
(74) *Attorney, Agent, or Firm* — Mintz Levin Cohn Ferris Glovsky and Popeo, P.C.

(57) ABSTRACT

Cable assemblies include at least a first wire and a second wire. The wires are enclosed, using injection molding, by a respective layer of thermo-resistant material. During the injection molding, the first wire and second wire are kept substantially straight so as to avoid kinks in at least one of the first wire and the second wire that can develop subsequent to the molding if a wire is not substantially straight. The tension associated with the first wire and the second wire is kept within a predetermined range or below a predetermined threshold. The predetermined range/threshold depends on a temperature associated with the injection molding. The injection molding can provide a zip structure over the wires such that the zip structure can be zipped-together and zipped-apart to prevent entanglement of the wires when used by a user.

10 Claims, 17 Drawing Sheets

(51) Int. Cl.
*B29C 45/14* (2006.01)
*H01B 7/29* (2006.01)
*H04R 1/10* (2006.01)
*H04R 5/033* (2006.01)
*B29L 31/34* (2006.01)
*H02G 3/04* (2006.01)

(52) U.S. Cl.
CPC .............. *H04R 1/1033* (2013.01); *H04R 5/033* (2013.01); *B29C 45/14467* (2013.01); *B29C 2045/0058* (2013.01); *B29L 2031/3462* (2013.01); *H02G 3/0475* (2013.01); *Y10S 174/11* (2013.01)
USPC ..................................... 174/36; 174/DIG. 11

(56) References Cited

U.S. PATENT DOCUMENTS

| | | | |
|---|---|---|---|
| 2,585,054 A * | 2/1952 | Stachura | 174/36 |
| 2,896,217 A | 7/1959 | Cedarstaff | |
| D203,677 S | 2/1966 | Spilman et al. | |
| 3,272,926 A | 9/1966 | Falkenberg et al. | |
| 3,441,951 A | 4/1969 | Lee et al. | |
| 3,454,964 A | 7/1969 | Brinkhoff et al. | |
| 3,505,684 A | 4/1970 | Hutchinson et al. | |
| D228,352 S | 9/1973 | Itagaki et al. | |
| D231,613 S | 5/1974 | Sarber | |
| 3,810,525 A | 5/1974 | Crenna | |
| 4,160,306 A | 7/1979 | Pizzoccaro | |
| D270,634 S | 9/1983 | Ungar | |
| 4,409,442 A | 10/1983 | Kamimura | |
| 4,588,868 A | 5/1986 | Bertagna et al. | |
| 4,802,638 A | 2/1989 | Burger et al. | |
| D301,145 S | 5/1989 | Besasie et al. | |
| 4,829,571 A | 5/1989 | Kakiuchi et al. | |
| D328,461 S | 8/1992 | Daido et al. | |
| D337,115 S | 7/1993 | Yamazaki et al. | |
| D353,817 S | 12/1994 | Wada | |
| D353,818 S | 12/1994 | Nakamura | |
| 5,391,838 A | 2/1995 | Plummer, III | |
| 5,406,037 A | 4/1995 | Nageno et al. | |
| 5,406,837 A | 4/1995 | Britt | |
| D391,573 S | 3/1998 | Nakamura | |
| 5,757,929 A * | 5/1998 | Wang et al. | 381/300 |
| 5,861,579 A | 1/1999 | Bickersteth et al. | |
| 5,906,507 A | 5/1999 | Howard | |
| 5,949,026 A * | 9/1999 | DeFlorio | 174/117 R |
| 5,958,315 A | 9/1999 | Fatato et al. | |
| 6,006,115 A | 12/1999 | Wingate | |
| D420,356 S | 2/2000 | Suzuki | |
| D430,140 S | 8/2000 | Roman | |
| D431,550 S | 10/2000 | Yoneda | |
| 6,324,053 B1 * | 11/2001 | Kamijo | 361/679.03 |
| 6,374,126 B1 | 4/2002 | MacDonald, Jr. et al. | |
| 6,480,611 B2 | 11/2002 | Hashimoto et al. | |
| 6,507,486 B2 * | 1/2003 | Peterson, III | 361/679.03 |
| D469,753 S | 2/2003 | Andre et al. | |
| D476,639 S | 7/2003 | Bergeron et al. | |
| D491,163 S | 6/2004 | Green | |
| 6,826,782 B2 * | 12/2004 | Jordan | 2/94 |
| 6,909,050 B1 * | 6/2005 | Bradford | 174/110 R |
| 6,946,047 B2 * | 9/2005 | Cao | 156/245 |
| D514,087 S | 1/2006 | Wilson et al. | |
| 7,077,693 B1 | 7/2006 | Symons | |
| 7,174,196 B2 | 2/2007 | Matsuda | |
| D538,261 S | 3/2007 | Taylor et al. | |
| D541,255 S | 4/2007 | Taylor et al. | |
| D546,321 S | 7/2007 | Kim | |
| D549,688 S | 8/2007 | Suzuki | |
| D549,847 S | 8/2007 | Sutton | |
| 7,256,347 B2 | 8/2007 | Gustavsson | |
| D569,841 S | 5/2008 | Chung et al. | |
| D573,581 S | 7/2008 | Gondo et al. | |
| D573,851 S | 7/2008 | Huynh | |
| D578,507 S | 10/2008 | Ando | |
| D581,394 S | 11/2008 | Lee | |
| 7,450,014 B2 | 11/2008 | Farhadian | |
| D585,871 S | 2/2009 | Lee | |
| D585,872 S | 2/2009 | Lee | |
| D588,098 S | 3/2009 | Kurihara | |
| D589,491 S | 3/2009 | Andre et al. | |
| 7,498,510 B2 * | 3/2009 | Chen et al. | 174/36 |
| D591,264 S | 4/2009 | Hong et al. | |
| D594,847 S | 6/2009 | Suzuki | |
| D596,690 S | 7/2009 | Bennett | |
| D598,010 S | 8/2009 | Matsuda et al. | |
| D599,778 S | 9/2009 | Ando | |
| D603,370 S | 11/2009 | Suzuki | |
| D605,628 S | 12/2009 | Ando | |
| D607,875 S | 1/2010 | Pedersen, II | |
| D614,168 S | 4/2010 | Rogers et al. | |
| D637,756 S | 5/2011 | Okano et al. | |
| D637,999 S | 5/2011 | Brunner et al. | |
| D639,775 S | 6/2011 | Horibe et al. | |
| D642,554 S | 8/2011 | Schaal et al. | |
| D643,414 S | 8/2011 | Lee et al. | |
| D649,956 S | 12/2011 | Gresko et al. | |
| D652,407 S | 1/2012 | Groset et al. | |
| 8,107,653 B2 | 1/2012 | Wolfe | |
| 8,147,270 B1 | 4/2012 | Wescott | |
| D662,080 S | 6/2012 | Carr et al. | |
| 8,269,110 B2 | 9/2012 | Scifo et al. | |
| 8,269,111 B2 | 9/2012 | Scifo et al. | |
| 2005/0069147 A1 * | 3/2005 | Pedersen | 381/74 |
| 2005/0098594 A1 | 5/2005 | Truong | |
| 2005/0123164 A1 | 6/2005 | Yao et al. | |
| 2006/0166720 A1 | 7/2006 | Dixon | |
| 2006/0185873 A1 | 8/2006 | Johnson | |
| 2007/0081690 A1 | 4/2007 | Stagni et al. | |
| 2008/0029288 A1 * | 2/2008 | Chen et al. | 174/68.3 |
| 2008/0099229 A1 * | 5/2008 | Scifo et al. | 174/117 R |
| 2011/0162883 A1 | 7/2011 | Groset et al. | |

FOREIGN PATENT DOCUMENTS

| | | |
|---|---|---|
| EP | 1509062 A1 | 2/2005 |
| JP | 07-115022 A | 5/1995 |
| JP | 2004056636 A | 2/2004 |
| JP | 2004-211225 A | 7/2004 |
| JP | 2006-527934 A | 12/2006 |
| JP | 3132983 U | 6/2007 |
| WO | WO 2004/112359 | 12/2004 |
| WO | WO-2009030578 A1 | 3/2009 |

OTHER PUBLICATIONS

"Yi Zip Earphones by Ji Woong", retrieved from the Internet on Mar. 20, 2012, <http://www.yankodesign.com/2009/04/22/zip-up-tangles/>.

"YI Sound Concept Brings the Hot Jean-Crotch Aesthetic to Earbuds", retrieved from the Internet on Jul. 5, 2012, <http://gizmodo.com/zipper-earbuds/>.

International Search Report and Written Opinion for corresponding PCT Application No. PCT/US2011/059637, Mar. 28, 2012.

Notice of Reasons for Rejection dated Nov. 2, 2012, for Japanese Patent Application No. 2011-241549.

* cited by examiner

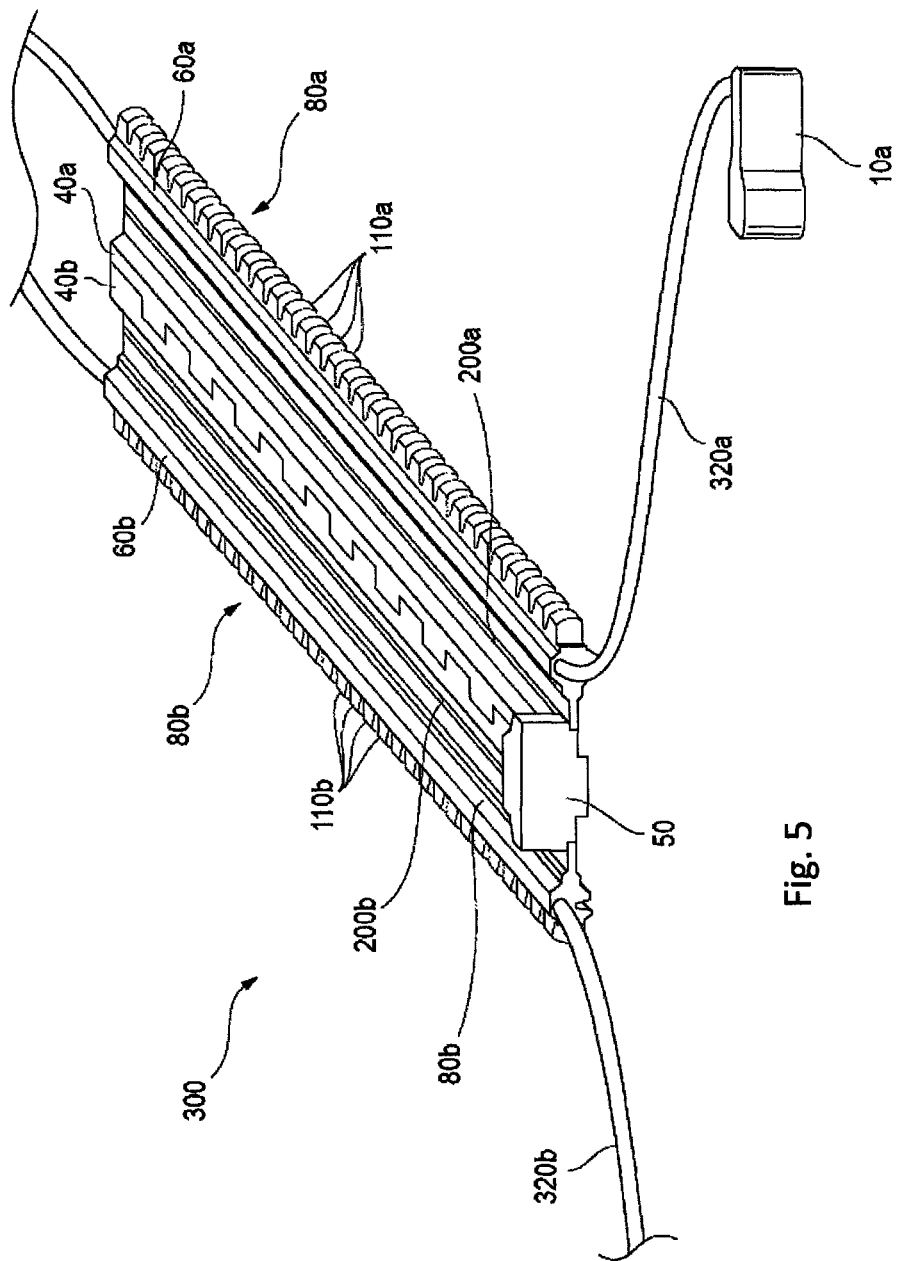

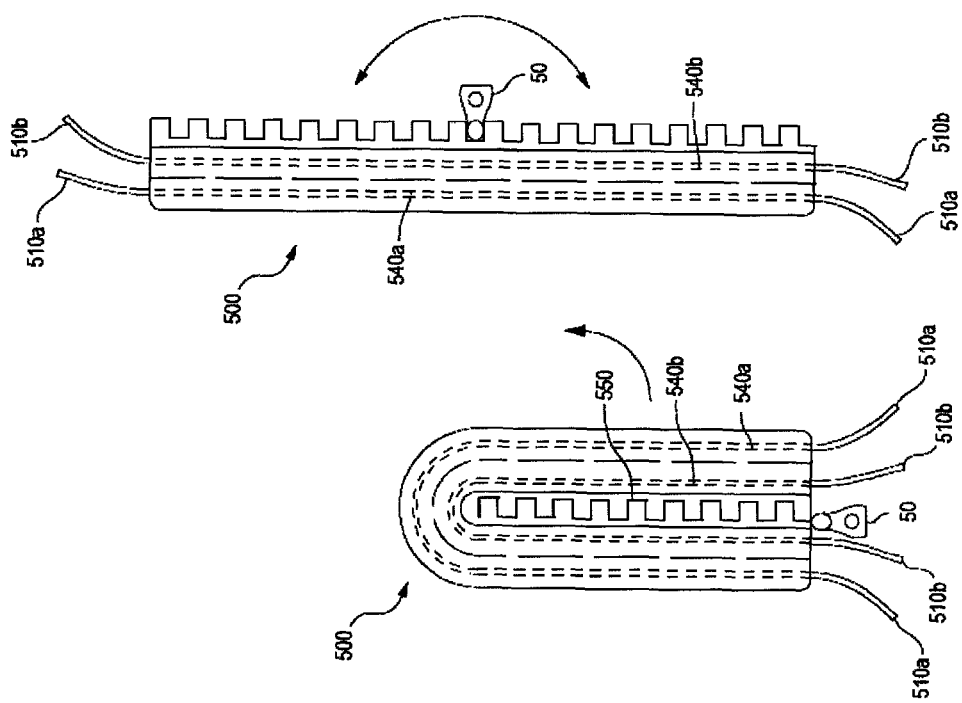

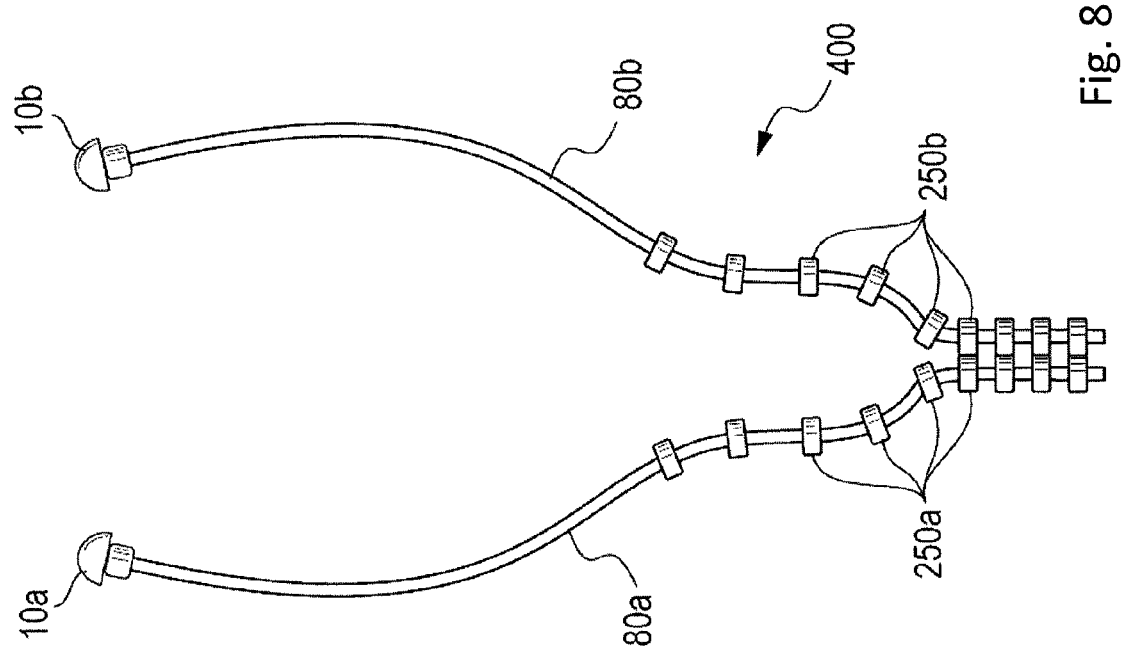

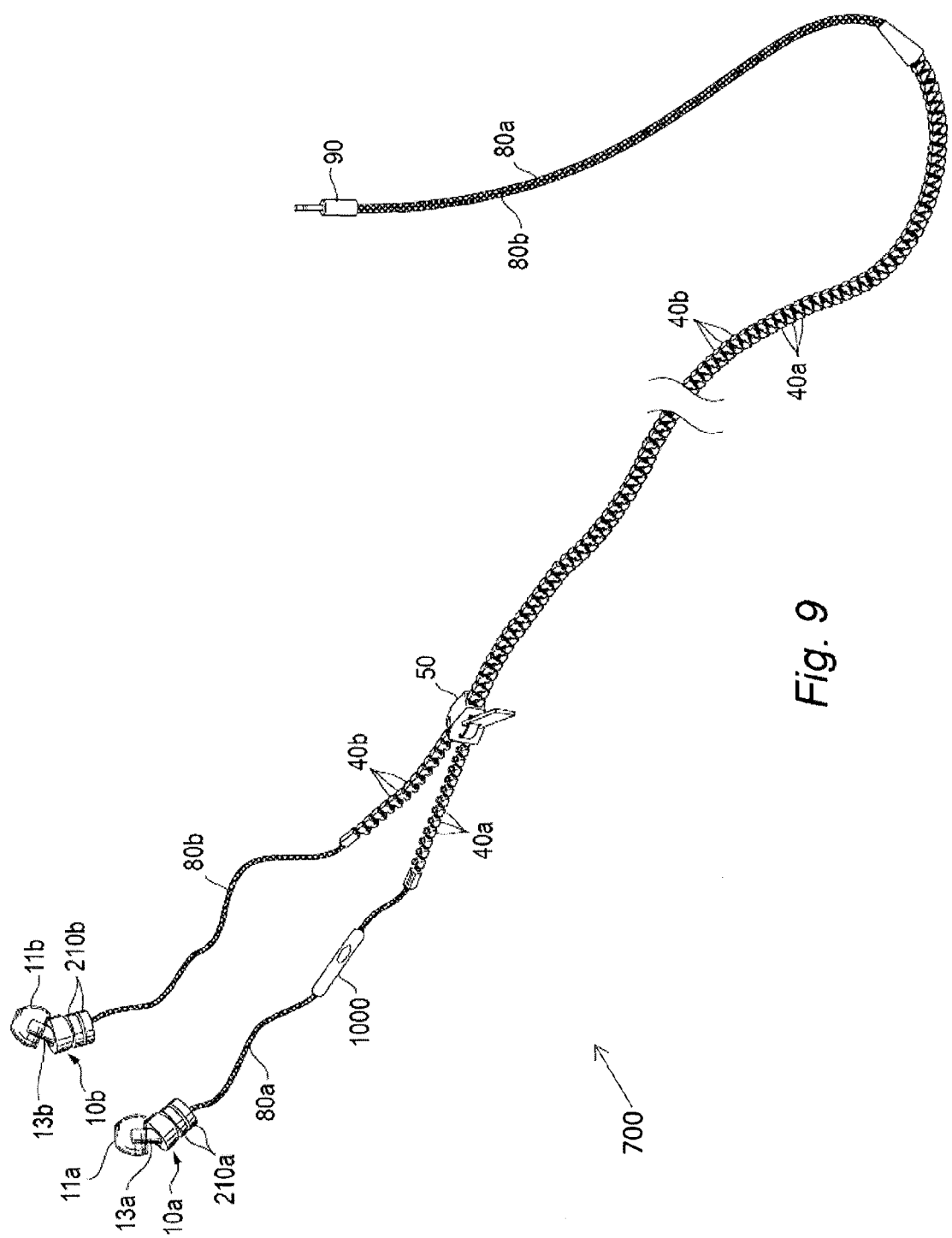

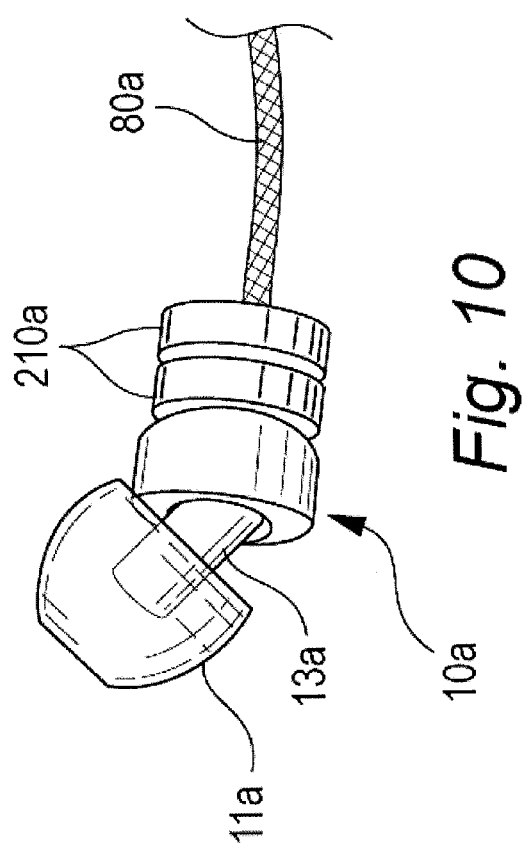

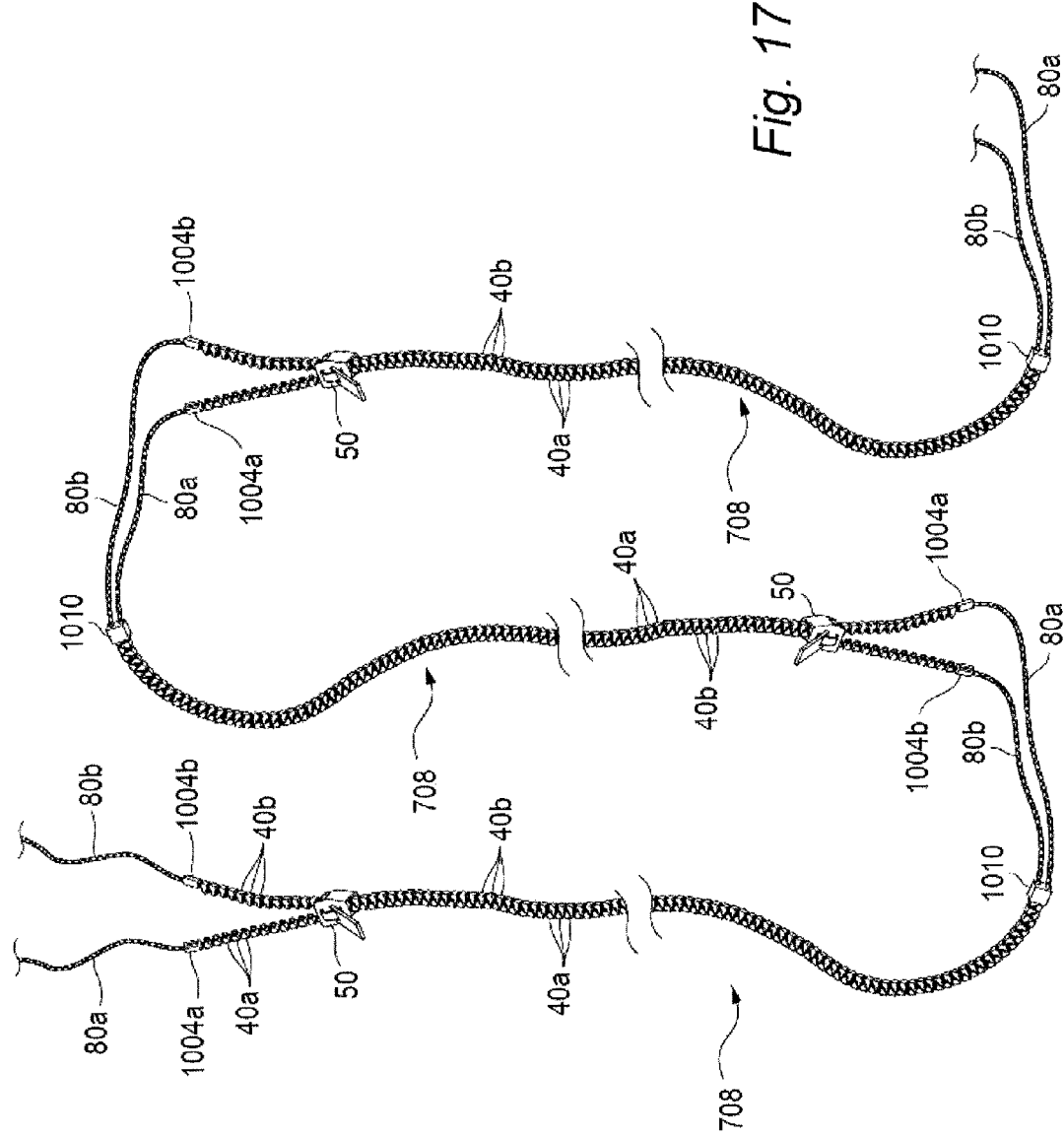

CABLE ORGANIZATION ASSEMBLIES

CROSS-REFERENCE TO RELATED APPLICATIONS

The current application is a continuation-in-part of co-pending application for U.S. patent application Ser. No. 29/397,922, filed on Jul. 22, 2011 and entitled "Zippered Earphones" which is a continuation of U.S. patent application Ser. No. 12/941,943, filed on Nov. 8, 2010, and entitled "Cable Organization Assemblies," which claims the benefit of U.S. Provisional Patent Application Ser. No. 61/292,981, filed on Jan. 7, 2010 and entitled "Cable Organization Assemblies." All applications to which the current application claims priority are incorporated by reference herein in their entireties.

TECHNICAL FIELD

The subject matter described herein relates to assemblies that are configured to prevent cables from becoming entangled with each other. Some implementations relate to two or more cables that are configured to be capable of releasable attachment/coupling to one another. Some implementations can be used to prevent entanglement of audio wires, such as headphone wires and stereo speaker wires, in addition to other suitable cables.

BACKGROUND

Multiple electronic devices are designed to be used with a plurality of connecting wires and cables. Common examples include audio or video players that have a headphone jack, or have ports for speaker wires. A common problem for users is that these cables often become entangled with each other. For example, left and right headphone wires readily become intertwined and knotted, especially in ear bud style headphones. Additionally, stereo speaker wires usually are configured in pairs and can also become entangled with themselves or other wires.

Accordingly, there is a need to provide cable assemblies that include means for preventing entanglement and easily allow the incorporation of a zipper or other releasable connection means to the cables.

SUMMARY

The current subject matter relates to cable assemblies that comprise at least a first wire and a second wire. Each wire is enclosed, using injection molding, by a respective layer of thermo-resistant material. During the injection molding, the first wire and second wire are kept substantially straight so as to avoid kinks in at least one of the first wire and the second wire that can develop subsequent to the molding if a wire is crooked, angled, round, wavy, or the like (that is, if the wire is not substantially straight). The tension associated with the first wire and the second wire is kept within a predetermined range or below a predetermined threshold. The predetermined range/threshold depends on a temperature associated with the injection molding. The injection molding can provide a zipper structure or other attachment device that allows for the releasable attachment of the first wire to the second wire such that the zip structure can be zipped-together and zipped-apart to prevent entanglement of the first wire and the second wire when used by a user. The cable assembly can incorporate different styles, types, and colors of releasable fasteners.

In one aspect, a cable assembly is provided. The cable assembly comprises a first wire encapsulated by a first outer layer comprising a thermo-resistant material; and a second wire encapsulated by a second outer layer comprising the thermo-resistant material, each of the first outer layer and the second outer layer comprising an attachment device that allows releasable attachment of the first wire to the second wire. The first wire is encapsulated by the first outer layer by injection molding, and the second wire is encapsulated by the second outer layer by injection molding. The first wire and the second wire are kept substantially straight during the injection molding while a tension force associated with the first wire and the second wire during the injection molding remains within a predetermined range. The tension force is determined using at least one of a tension meter and a load cell. The predetermined range is based on a temperature associated with the injection molding. The first wire and the second wire are configured to minimize noise associated with an audio signal transmitted through the first wire and the second wire. The cable assembly further comprises a jack and one or more headphones, the first wire and the second wire connecting the jack with the respective one or more headphones, the first wire and the second wire being configured to transmit audio sound from the jack to the one or more headphones. The cable assembly is incorporated into an article of clothing, and wherein the first wire and the second wire are capable of separating at least the one or more headphones from the article of clothing by using a releasing mechanism. A jack is associated with the cable assembly and the jack is positioned within a pocket of the article of clothing. The thermo-resistant material comprises at least one of draw textured yarn and braided nylon; a releasable attachment comprising complementary thermoplastic zipper teeth; and the first wire and the second wire are individually encapsulated in an inner layer positioned underneath the outer layer, the inner layer associated with thermo-resistant and elastomeric properties, the inner layer comprising a thermoplastic elastomer.

In another aspect, a method of forming a cable assembly is provided. The method comprises providing a first wire and a second wire that are enclosed by corresponding outer layers comprising a thermo-resistant material; and releasably attaching (herein, "releasably attaching" refers to releasable attachment) the outer layers of the first wire and the second wire, such that the outer layers are capable of releasable attachment of the first wire with the second wire. The first wire is enclosed by a first outer layer of the outer layers by injection molding and the second wire is enclosed by a second outer layer of the outer layers by injection molding. The first wire and the second wire are kept substantially straight during the injection molding while the tension force associated with the first wire and the second wire during the injection molding remains within a predetermined range. At least one of a tension meter and a load cell is used to determine the tension force. The predetermined range is based on a temperature associated with the injection molding. The first wire and the second wire are configured to minimize noise associated with an audio signal transmitted through the first wire and the second wire. The method further comprises incorporating the cable assembly into an article of clothing, the cable assembly being associated with a jack; and positioning the jack within a pocket of the article of clothing.

In another aspect, a method of manufacturing an earphone cable assembly comprising at least two cables is provided. The method comprises holding the at least two cables substantially straight to avoid one or more kinks in the at least two manufactured cables; performing injection molding to inject zipper teeth on the at least two cables; and removing excess molding from the injected zipper teeth. The method further comprises rotating the zipper teeth from an outward position to an inward position such that distal ends of the zipper teeth point inward after the rotation, the distal ends characterizing respective portions of teeth that are cut so that the excess molding is removed, the rotation allowing zippering together of the zipper teeth and zipping apart of the zipped zipper teach. Tension associated with the at least two cables that holds the at least two cables substantially straight is maintained below a threshold value, with the threshold value being dependent on a molding temperature associated with the injection molding; and the tension is measured by at least one of a tension meter and a load cell. The method further comprises incorporating the earphone cable assembly into an article of clothing, wherein the first wire and the second wire are capable of being separated from at least the one or more headphones by using a releasing mechanism, the earphone cable assembly being associated with a jack; and positioning the jack within a pocket of the article of clothing.

BRIEF DESCRIPTION OF THE DRAWINGS

FIG. 5 illustrates a close-up view of a second alternative zipper earphone cable assembly in accordance with some implementations of the current subject matter;

FIG. 6a illustrates a closed cable assembly that can open to twice its compressed length in accordance with some implementations of the current subject matter;

FIG. 6b illustrates an opened cable assembly that is expanded to two times the length of its closed configuration in accordance with some implementations of the current subject matter;

FIG. 8 illustrates a perspective view of an earphone cable assembly that utilizes magnets as a releasable fastener in accordance with some implementations of the current subject matter;

FIG. 9 illustrates a perspective view of a third zipper earphone cable assembly in accordance with some implementations of the current subject matter;

FIG. 10 illustrates an exemplary ear bud of the zipper earphone cable assemblies in accordance with some implementations of the current subject matter;

FIG. 17 illustrates a perspective view of multiple zipper teeth unit having been injection molded onto the same two cables in accordance with some implementations of the current subject matter;

Like reference symbols in the various drawings indicate like elements.

DETAILED DESCRIPTION

The cable assemblies, as described herein, can include at least two cables (for example, cables 80a, and 80b) that are capable of releasable attachment. Although two cables have been described, more than two (for example, 3, 4, 5, 6, 7, 8, 9, 10 or more) cables can be used.

Earphone Cable Assemblies

Figure 1:
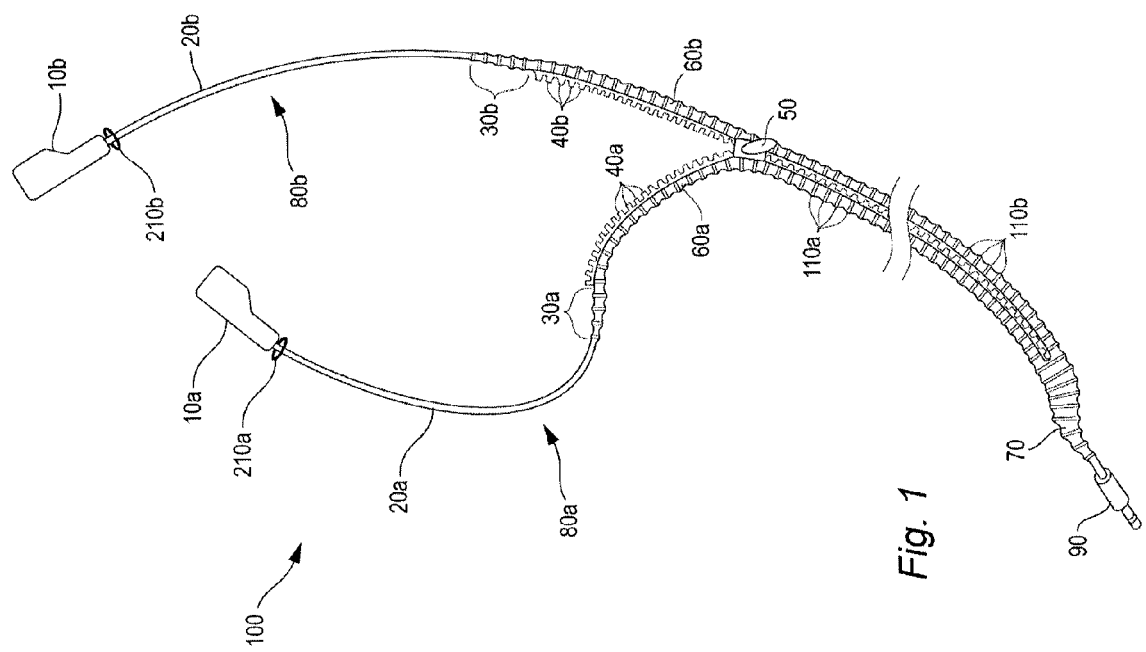
FIG. 1 illustrates a perspective view of a first zipper earphone cable assembly in accordance with some implementations of the current subject matter.

FIG. 1 illustrates a perspective view of a first zipper earphone cable assembly 100 in accordance with some implementations of the current subject matter. The first zipper earphone cable assembly 100 comprises first cable 80a and second cable 80b that include an attachment device (for example, a zipper) for the releasable attachment between the two cables 80a and 80b. Each cable 80a and 80b can be operably coupled to an earphone 10a and 10b at a first end and coupled to a headphone jack 90 suitable for connection to an audio playing device at the other end. The head phone jack can be any suitable jack, such as a 6.35 mm jack, 3.5 mm miniature jack, a 2.5 mm subminiature jack, and the like.

More specifically, each of the two cables 80a and 80b can include an outer layer or over-mold 60a and 60b that can be made of rubber or other flexible material, which can be incorporated using any suitable method, such as cast or injection molding, and the like. The over-mold 60a and 60b can make it simpler for manufacturing the assemblies herein, as the over-mold 60a and 60b can easily encapsulate/enclose/cover the wires. Other suitable flexible materials for the over-mold can include fabric, plastic, and foam.

Figure 2:
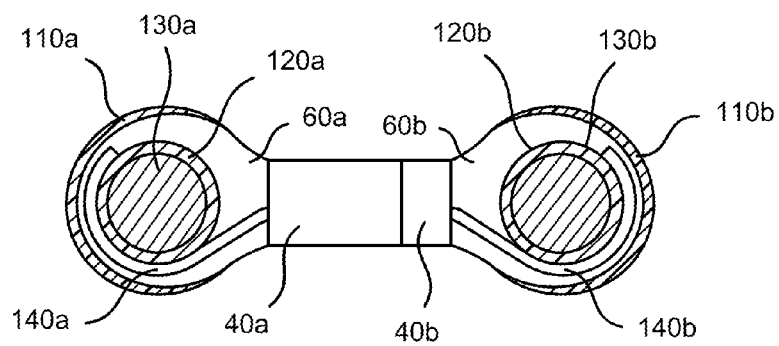
FIG. 2 illustrates a cross-section view of two cables in a first zipper earphone cable assembly in accordance with some implementations of the current subject matter.

FIG. 2 illustrates a cross-section view of two cables 80a and 80b in a first zipper earphone cable assembly 100 in accordance with some implementations of the current subject matter. As shown in the cross-sectional view of FIG. 2, the outer layering 60a and 60b can be layered over the headphone wire 130a and 130b and the headphone wire casing 120a and 120b.

The headphone wires 130a and 130b can operably couple with a jack 90 to the earphones 10a and 10b so that audio can be transmitted. A major portion of the entire length of the cables 80a and 80b can include means for releasable attachment together, such as a zipper. The cables 80a and 80b can be coupled to inward facing complementary zipper teeth 40a and 40b that can allow the cables 80a and 80b to be zipped together and be unzipped using a zipper tab 50 or other means for sliding. Alternatively, a ZIPLOC® style or other similar closure can be used.

In some implementations, the means (for example, zipper, magnets, and the like) for releasable attachment may traverse a portion of the entire length of the cables 80a and 80b, as measured from the stop 70 or jack 90 to the earphones 10a and 10b. This partial traversal (that is, traversal of a portion of the entire length) is advantageous as it prevents the zipper teeth 40a and 40b from painfully contacting or pinching either face or neck of a user. To prevent this painful contact or pinch, the assembly 100 can further include a non-teethed section 20a and 20b. Alternatively, the over-mold can simply end before the earphones 10a and 10b (such as at sections 30a and 30b) and the headphone wire casing 120a and 120b can simply be exposed for a portion of their length.

In optional implementations, the outer layer 60a and 60b can include ribs 110a and 110b. Ribs 110a and 110b can characterize/provide protrusions and recessions along the length of the outer molding 60a and 60b. The ribs 110a and 110b can characterize removed/reduced material, thereby reducing weight from the overmold 60a and 60b and allowing for better manipulation of the assembly 100. Therefore, the inclusion of ribs 110a and 110b can be used to achieve better flexibility and weight reduction.

The cables 80a and 80b can include non-ribbed sections without means for releasable connection (for example, zippers) 20a and 20b and can include ribbed sections 30a and 30b that lack means for releasable attachment, depending on specific design goals. In some implementations, the material that constitutes the outer layer 60a and 60b can be used for non-teethed sections 20a and 20b and can be used for the stop 70.

The bottom end of the zipper can include a means for stopping the zipper so that the cables 80a and 80b remain engaged (that is, so that the cables 80a and 80b may not become completely disengaged). As illustrated in FIG. 1, molded material of stop 70, which is same (or similar) as molded material for 60a and 60b, can taper downward towards the plug 90, or be in another suitable configuration. Other suitable stops are readily contemplated herein.

Further, as illustrated in FIG. 2, both the headphone wires 130a and 130b and their casings 120a and 120b can be encapsulated/enclosed by the over-mold material 60a and 60b. According to some implementations, wherein a zipper is used, flexible zipper backing material 140a and 140b can be wrapped around the headphone wire casings 120a and 120b and also be encapsulated/enclosed by the over-mold material 60a and 60b. The zipper backing material 140a and 140b can be made of any suitable, flexible material such as fabric, including AQUAGUARD® manufactured by YKK®. Encapsulating the wires 130a and 130b, their casings 120a and 120b, and the zipper backing material 40a and 40b in the over-mold material 60a and 60b in a single process can efficiently minimize manufacturing steps.

For manufacturing the assembly 100 a mold can be configured to encapsulate the headphone wires 130a and 130b up to the earphones 10a and 10b if desired. Alternatively, the mold can be configured such that the over-mold ends before the earphones 10a and 10b and the headphone wire casing 120a and 120b can simply be exposed for a portion of their length. The zipper backing material 140a and 140b can then be wrapped around the headphone wire casings 120a and 120b and placed into the mold. Rubber, or other suitable materials, can be added to the mold and can be allowed to harden to form the final assembly.

Figure 3:
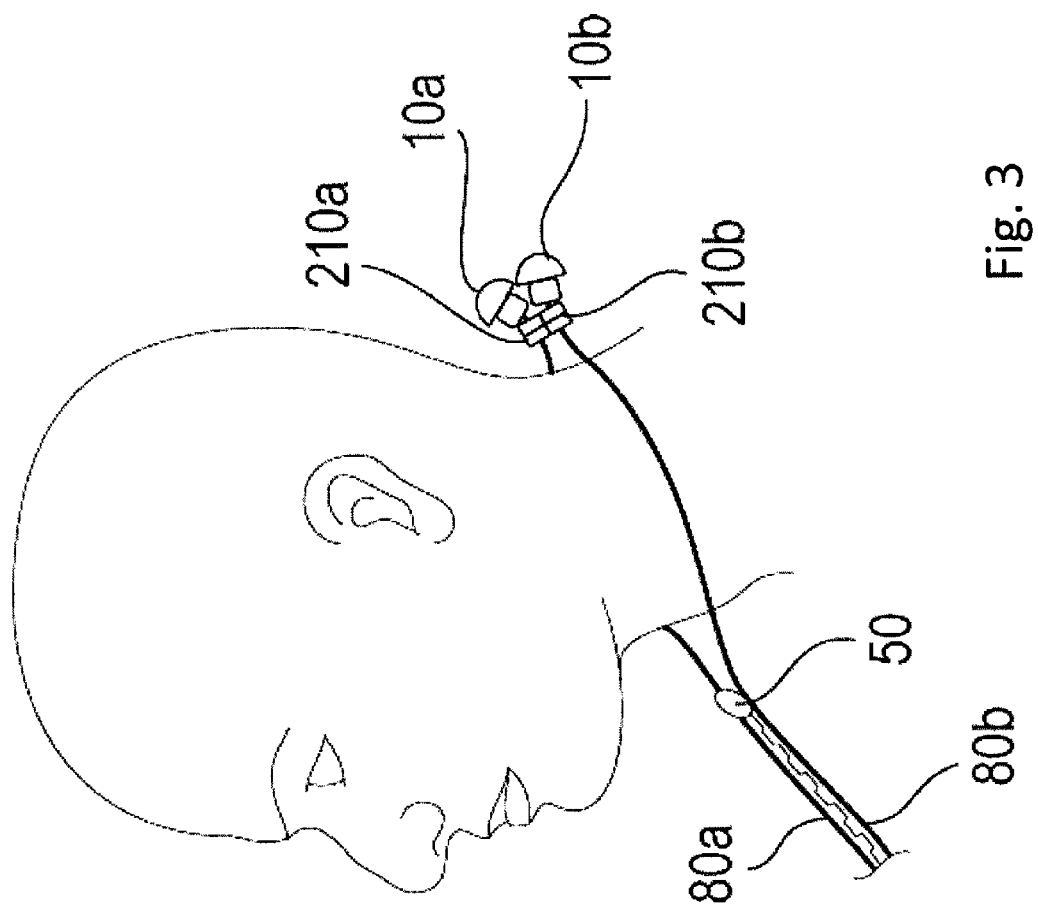
FIG. 3 illustrates perspective view showing a zipper earphone cable assembly in use in accordance with some implementations of the current subject matter.

FIG. 3 illustrates a perspective view showing a zipper earphone cable assembly in use in accordance with some implementations of the current subject matter. As the releasable attachment means add additional weight to headphone wires 20a and 20b by themselves, some implementations can include the use of means to prevent the earphones 10a and 10b from falling downward quickly when taken out of a user's ears. Complementary oppositely charged magnets 210a and 210b, or other means for releasable attachment, can be used either on or near the earphones 10a and 10b, such as in the non-teethed region 20a and 20b. As illustrated in FIG. 3, when a user removes the earphones 10a and 10b from their ears, the user can connect the earphones 10a and 10b (or cables 80a and 80b) together behind the neck of the user by using the magnets 210a and 210b or means for releasable attachment, such as a clips, snaps, hook and loop fasteners, and the like. An ear hook or a similar device can also be provided with some implementations to assure stability of the earphone in conditions such as sports activities.

Figure 4:
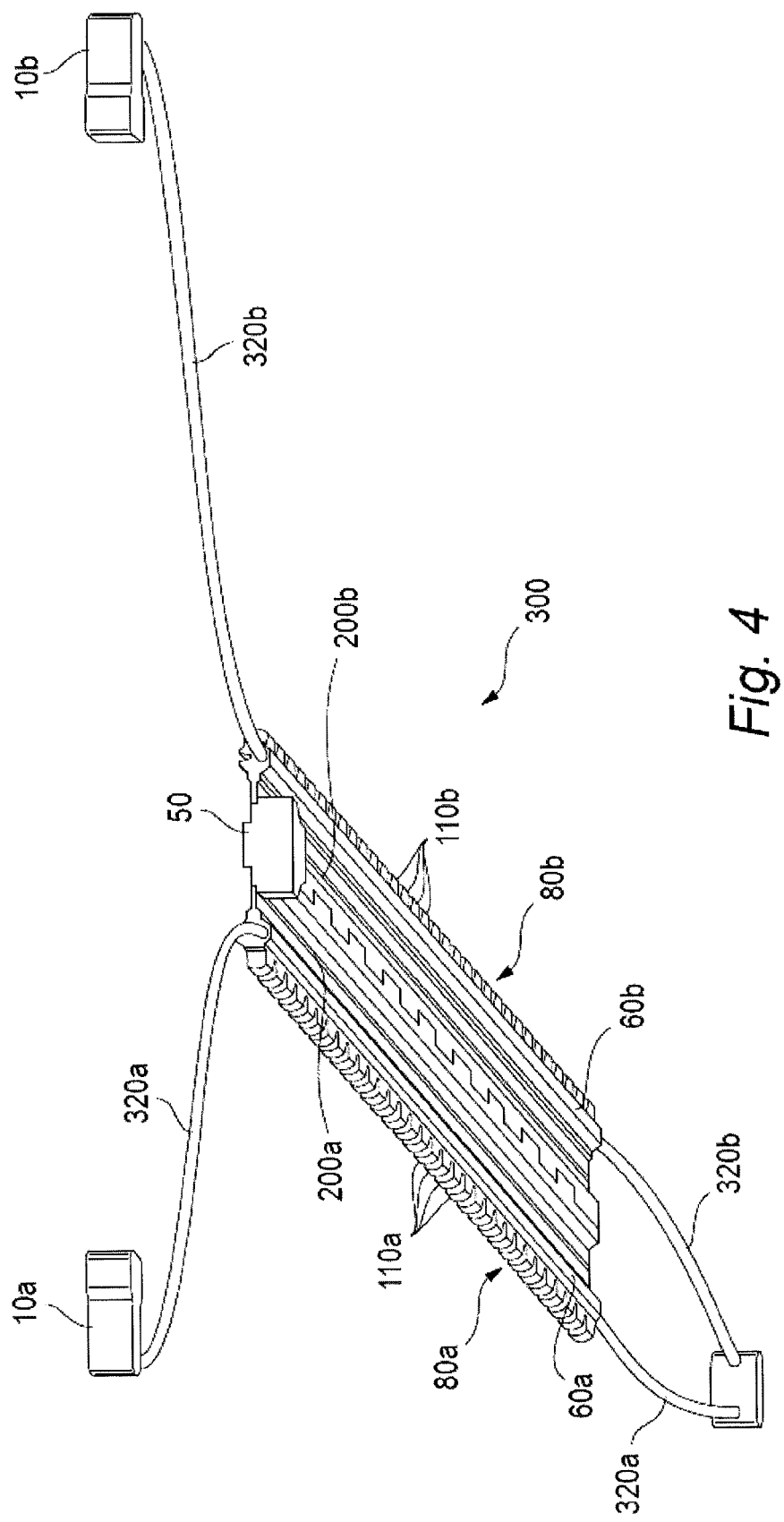
FIG. 4 illustrates a perspective view of a second alternative zipper earphone cable assembly in accordance with some implementations of the current subject matter.

FIG. 4 illustrates a perspective view of a second alternative zipper earphone cable assembly 300 in accordance with some implementations of the current subject matter. The design of the second alternative zipper earphone cable assembly 300 can differ from the first zipper earphone assembly 100 described above, as the over-mold material 60a and 60b can only partially cover the first and second earphone wires 320a and 320b. If desired, features of the first zipper earphone cable assembly 100 can readily be interchanged with features of the second zipper earphone assembly 300. A first earphone wire 320a and second earphone wire 320b can be partially molded into an over-mold material 60a and 60b. Each cable 80a and 80b can include zipper teeth 40a and 40b or other suitable means for releasable attachment with each other. A zipper tab or slider 50 or other means for opening and closing the means for releasable attachment can also be provided. Each cable 80a and 80b can optionally include ribs 110a and 110b to allow for more flexible movement and reduced weight. Additionally two troughs 200a and 200b can traverse parallel or substantially so to the means for releasable attachment (for example, zipper 40a and 40b). In addition to a zipper, other suitable means for attachment can include small magnets, a ZIPLOC® style closure, or the like. Certain implementations may expressly exclude the use of rough hook and loop fasteners such as VELCRO® with the assemblies provided herein, as an optional feature, as they can be abrasive on a user's skin. The mold for making the assembly 300 can be configured to cover a portion of the entire length of the earphone wires 320a and 320b, and can have the same or similar cross-section illustrated and described with respect to FIG. 2. Accordingly, methods of making the assembly described with respect to FIGS. 1 and 2 can be applied to this particular implementation as well.

FIG. 5 illustrates a close-up view of a second alternative zipper earphone cable assembly 300 in accordance with some implementations of the current subject matter.

Figure 11:
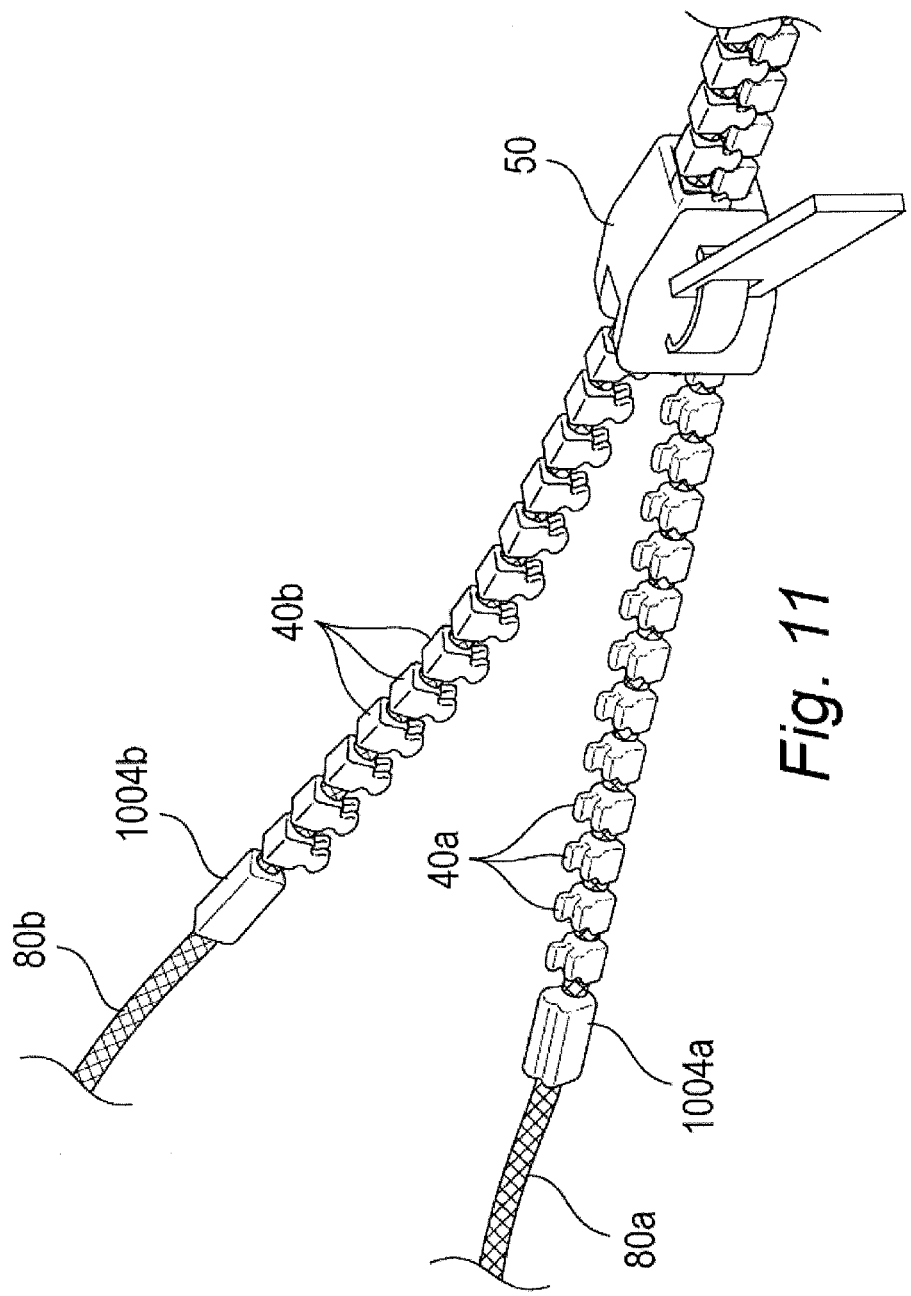
FIG. 11 illustrates a close up view of a third zipper earphone cable assembly in accordance with some implementations of the current subject matter.

FIG. 9 illustrates a perspective view of a third zipper earphone cable assembly 700 in accordance with some implementations of the current subject matter. In contrast to the first 100 zipper cable assembly and second zipper cable assembly 300, the third zipper earphone cable assembly 700 expressly may not have an over-mold 60a and 60b in a finished form. Rather, complementary zipper teeth 40a and 40b, which can be configured to operably zip together and apart with a slider 50, can be positioned directly onto the cables 80a and 80b, as shown by FIG. 11, which illustrates a close up view of a third zipper earphone cable assembly 700 in accordance with some implementations of the current subject matter. Similar to the above implementations, the third implementation of a zipper earphone cable assembly 700 can include two headphones such as ear buds 10a and 10b operably coupled to a lower jack 90.

FIG. 10 illustrates an exemplary ear bud 10a of the zipper earphone cable assemblies (at least one of 100, 300, 400, 500, 600, and 700—some of these are described below while others are described above as well) in accordance with some implementations of the current subject matter. According to specific implementations, the ear bud 10a can include a diaphragm 11a made of a thin material and coupled to an angled extension 13a configured to fit within a user's ear and transmit sound. The extensions 13a and 13b can be angled towards the user's ears during wear, thereby providing advantage of preventing the buds 10a and 10b from falling out of the user's ear due to the extra (compared to weight of conventional headphones) weight that the zipper teeth 40a and 40b and slider 50 add to the cables 80a and 80b. Complementary oppositely charged magnets 210a and 210b, or other means for releasable attachment can be used either on or near the earphones 10a and 10b. As illustrated in FIG. 3, when a user removes the earphones 10a and 10b from the user's ears, the user can connect the earphones 10a and 10b (or cables 80a and 80b) together behind the user's neck using the magnets 210a and 210b or means for releasable attachment, such as one or more clips, snaps, hook and loop fasteners, and the like. Although exemplary ear buds 10a and 10b have been described, a skilled artisan understands that other suitable earphones, such as conventional ear buds, can be used instead.

The assemblies described herein, including the third earphone zipper implementation 700, can optionally include a volume control 1000 positioned on the first cable 80a above the zipper teeth 40a. The volume control 1000 can be operably coupled to the internal wiring of the cable 80a and can include an external control mechanism configured to increase/decrease volume and/or completely mute volume such that no significant audio signal is transmitted to the ear buds 10a and 10b. The volume control 1000 can be accessed and used by the user. The volume control 1000 can also be positioned on the second cable 80b.

FIG. 11 illustrates a close up view of a third zipper earphone cable assembly 300 in accordance with some implementations of the current subject matter, as noted above.

FIGS. 12-18 illustrate a method of manufacturing the third implementation of a zipper earphone cable assembly 700 using fabrication techniques. Such fabrication techniques can include injection molding, and more specifically plastic injection molding. Molding can be a process of manufacturing by shaping pliable raw material using a rigid frame. Although injection molding has been described herein, other fabrication techniques are also possible, such as compaction, compression molding, expandable bead molding, extrusion molding, foam molding, laminating, matched molding, matrix molding, pressure plug assist molding, rotational molding, transfer molding, thermoforming, vacuum forming, and vacuum plug assist molding. Further, although molding has been described herein, other manufacturing/fabrication techniques are possible, such as sawing, shearing, chiseling, hammering, binding (using at least one of adhesives, threads, rivets, and the like), machining, forging, casting, and the like. These noted techniques can be used either individually or in a suitable combination, as appropriate.

Figure 12:
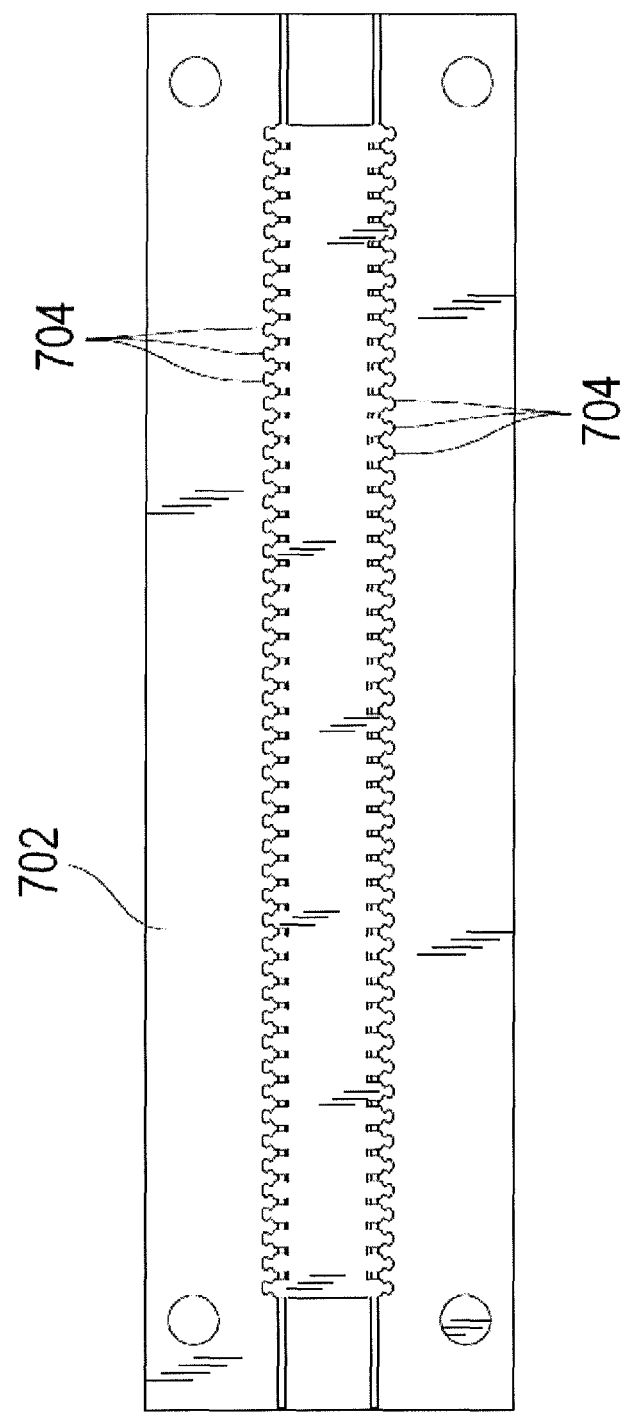
FIG. 12 illustrates a topside view of two earphone cables being placed in a mold in accordance with some implementations of the current subject matter.

FIG. 12 illustrates a topside view of two earphone cables 80a and 80b being placed in a mold 702 in accordance with some implementations of the current subject matter.

Figure 13:
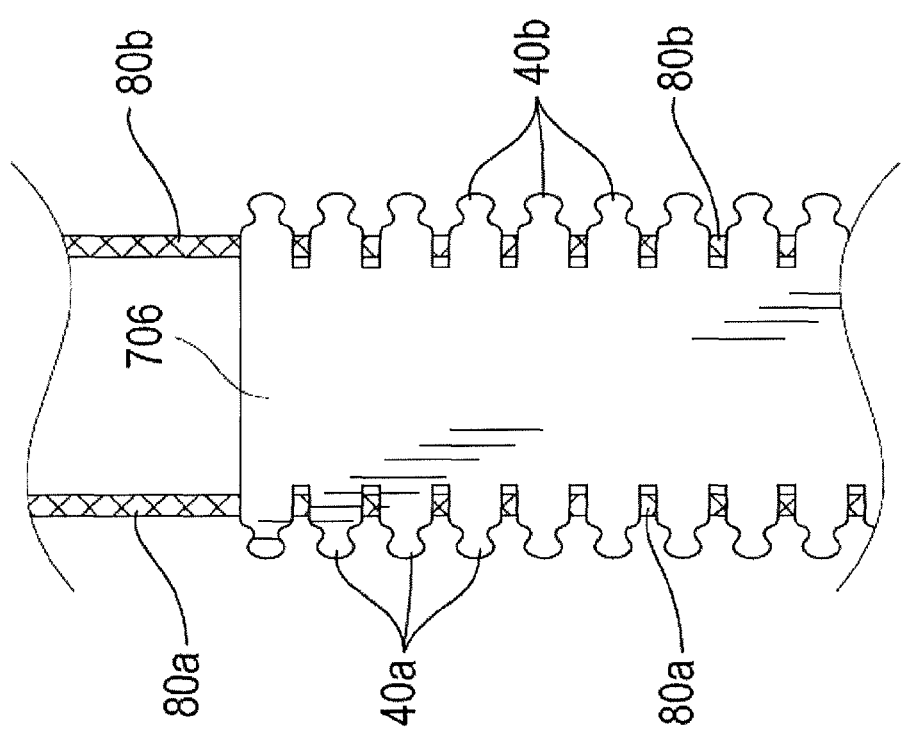
FIG. 13 illustrates a topside view of a zipper teeth being injected molded onto the two cables and excess molding in accordance with some implementations of the current subject matter.

FIG. 13 illustrates a topside view of a zipper teeth 40a and 40b being injected molded onto the two cables 80a and 80b and excess molding in accordance with some implementations of the current subject matter.

Figure 14:
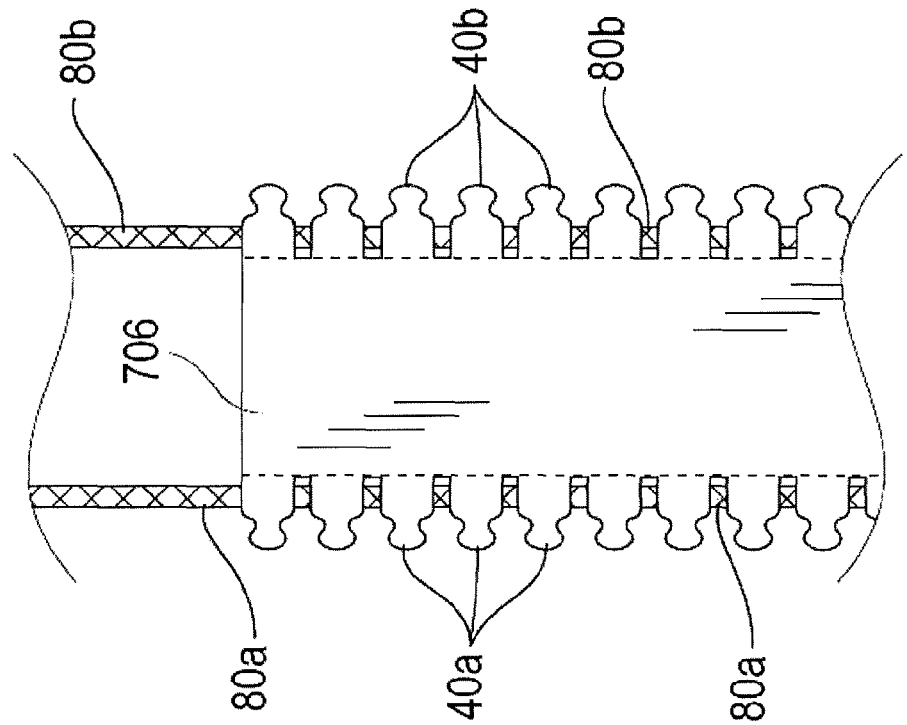
FIG. 14 illustrates a topside view of the excess molding being cut away from the zipper teeth in accordance with some implementations of the current subject matter.

FIG. 14 illustrates a topside view of the excess molding being cut away from the zipper teeth 40a and 40b in accordance with some implementations of the current subject matter.

Figure 15:
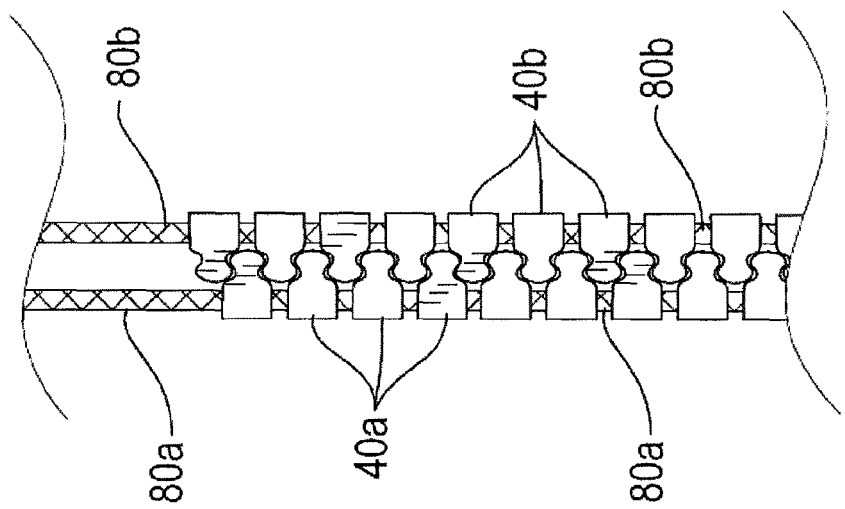
FIG. 15 illustrates a topside view showing the zipper teeth being rotated 180 degrees in accordance with some implementations of the current subject matter.

FIG. 15 illustrates a topside view showing the zipper teeth 40a and 40b being rotated 180 degrees in accordance with some implementations of the current subject matter.

Figure 16:
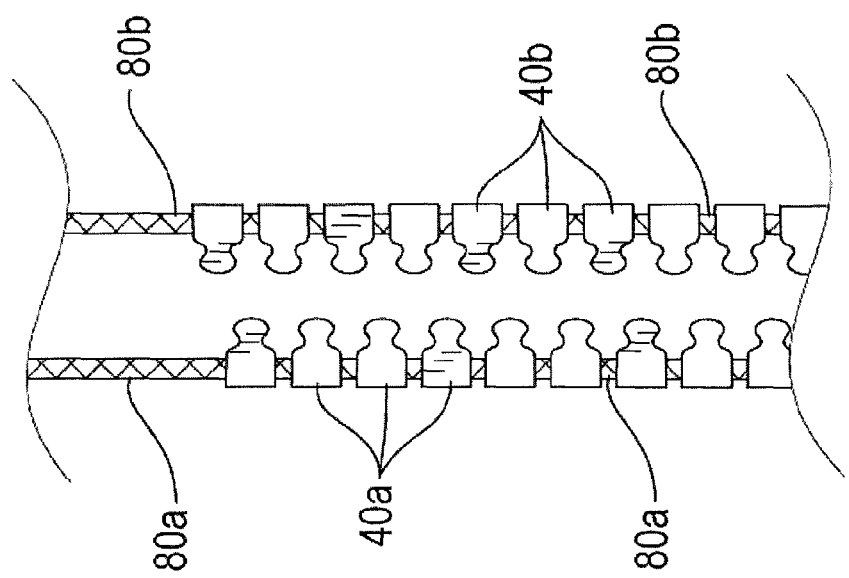
FIG. 16 illustrates a topside view showing the zipper teeth zippered together in accordance with some implementations of the current subject matter.

FIG. 16 illustrates a topside view showing the zipper teeth 40a and 40b zippered together in accordance with some implementations of the current subject matter.

Injection molding is a manufacturing process for producing elements from thermoplastic and thermosetting plastic materials. In injection molding, material can be fed into a heated barrel/tool, mixed, and forced into a mold cavity, where the material cools and hardens to the configuration of the mold cavity. For example, polyacetal (POM) zipper resin can be forced into the tool over the cable jacket at high pressure to completely fill the mold cavity. The zipper teeth 40a and 40b can be made of a thermoplastic material. The thermoplastic material can include polymers that are in a liquid state when heated and then harden into a solid state after cooling down. Some examples of the thermoplastic material can include polyacetal, polyethylene and polypropylene. Advantageously, self lubricating plastics, such as polyacetal (POM) and polypropylene (PP), can be used for snag-free zipper operation. Polyacetal (POM) can be used advantageously for its strength and wide temperature tolerance.

As illustrated in FIG. 12, first and second cables 80a and 80b can be positioned into a mold 702 having cavities 704a and 704b in the shape of the final zipper teeth 40a and 40b. The cables 80a and 80b can be held or clamped at a tension taught enough to allow injection molded plastic to bind to them according to a predetermined spacing but not overly taught, which can cause the internal wires or the outer covering of the cables 80a and 80b to break apart or get damaged. During injection molding, the cables 80a and 80b can be kept straight (or substantially straight) so that kinks in the cables 80a and 80b can be avoided/minimized. To keep the cables 80a and 80b straight, high tension forces can be used. Tension ranges for holding the cables 80a and 80b during injection molding can range from 3 kg of back tension to 20 kg of back tension, and in one implementation, the tension force can be up to 10 kg of back tension. When the high tension forces on the cables 80a and 80b exceed a predetermined tolerable limit of tension, the high tension can impose intense load on those cables 80a and 80b at elevated temperatures. This intense load can cause the cables 80a and 80b to be overly stressed or damaged. To avoid such a stress and/or damage, a tension meter and/or a load cell can be used to measure tension, and ensure that the tension remains below the predetermined tolerable limit. The predetermined tolerable limit can characterize the pull strength of the cables 80a and 80b, wherein the pull strength can be rated for a predetermined temperature (for example, 200° Celsius) associated with the molding conditions. This rating can be readily available so that this rating can be read to keep the tension below the tolerable limit.

At high temperatures (for example, 200° Celsius) associated with the molding process, attaching the zipper teeth can provide severe thermal stress due to this high temperature.

Moreover, at such high temperatures (for example, 200° Celsius), the tensile strength of the cables 80a and 80b can be relatively reduced. In case of some thermoplastics, such as polyacetal (POM) (including DELRAN brand polyacetal), the injection molding temperature can be heated to about 200° Celsius. Positioning the plastic through the tooling additionally can subject the cables 80a and 80b to extreme stresses as those cables 80a and 80b can often get clamped and pulled taught. Thus, besides the breakage/damage of cables 80a and 80b due to high tension forces, the breakage/damage can be caused due to loss in strength of cables 80a and 80b, wherein the loss in strength can be caused due to the high temperatures associated with the molding approaching or exceeding the plastic glass state ($T_g$), which is associated with liquid glass transition. To prevent this breakage/damage of the cables 80a and 80b, reinforcement fibers, calibrated precision tensioning, and high temperature tolerance cable insulation materials can be used. Further, the outer jacket/cover of the cables 80a and 80b can be used such that this outer jacket/cover can tolerate the high temperatures noted above. These materials and properties are useful to overcome the stresses of manufacturing, and are also useful as those materials and properties allow the cable assembly to be more durable when used by a consumer.

FIG. 17 illustrates a perspective view of multiple zipper teeth unit having been injection molded onto the same two cables 80a and 80b in accordance with some implementations of the current subject matter.

Figure 18:
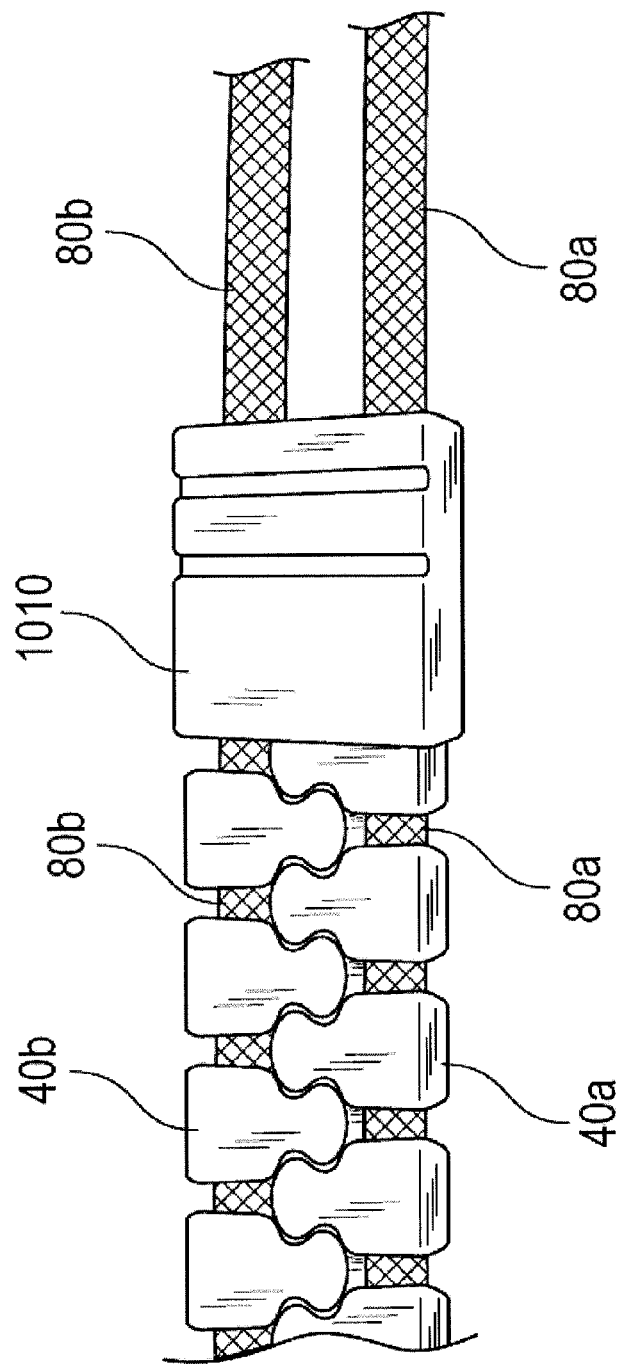
FIG. 18 illustrates a zipper bottom being placed below a zipper unit in accordance with some implementations of the current subject matter.

FIG. 18 illustrates a zipper bottom 1010 being placed below a zipper unit in accordance with some implementations of the current subject matter.

Figure 19:
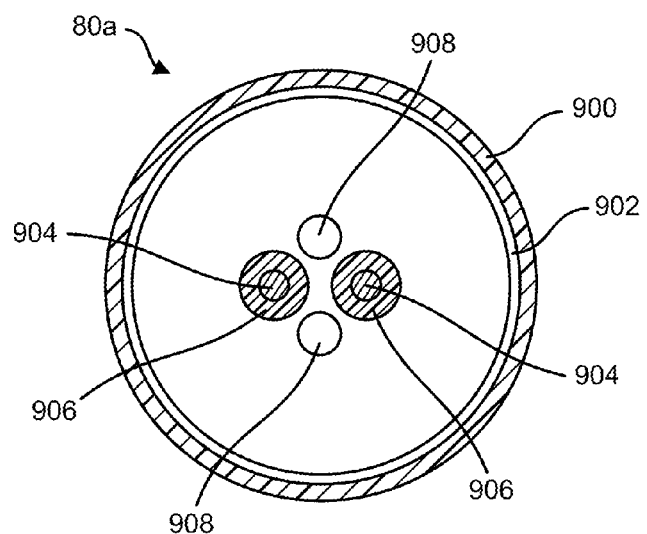
FIG. 19 illustrates a cross-sectional view of cable in a third zipper earphone cable assembly in accordance with some implementations of the current subject matter.

FIG. 19 illustrates a cross-sectional view of cable 80a (can also be 80b) in a third zipper earphone cable assembly in accordance with some implementations of the current subject matter. This cross-sectional view can be used in accordance with the teachings herein that show both the internal wiring and the outer covering. According to some exemplary implementations, the cables 80a and 80b can comprise an outer surface 900, such as braided nylon. More specifically, the outer surface 900 can be in the form of draw textured yarn (DTY) that can be heat resistant. The use of braided nylon as an outer covering can be advantageous, as braided nylon is elastic and is thermal-resistant to the heat associated with injection molding. Additionally, the texture of the braided nylon can allow the zipper teeth 40a and 40b to attach better, as opposed to a smooth cable outer surface, such as rubber. The average thicknesses for the outer layer 900 can be about 0.15 mm. The outside diameter of the outer layer 900 can be between 1.35 mm and 1.65 mm, or more specifically 1.5 mm, or 1.35 mm-1.4 mm.

An inner layer 902 can also be used. The inner layer 902 can include a material having elastic properties, such as a thermoplastic elastomer (TPE) and more specifically an extruded thermoplastic elastomer (TPE). The extruded thermoplastic elastomer can include copolymers or a physical mix of polymers (usually a plastic and a rubber) which can include materials with both thermoplastic and elastomeric properties. Reinforcement fibers 908 can also be used to add strength to the cables 80a and 80b as fabrication and function can involve higher pull strength than conventional earphone cables. Exemplary materials include aramids, such as KEVLAR. The Kevlar can be a 200D-400D KEVLAR, including a 200D KEVLAR, a 300D KEVLAR, and a 400D KEVLAR. The aramids described herein include meta-aramids and para-aramids. Examples of para-aramids can be KEVLAR, TECHNORA, TWARON, and HERACHRON. Examples of meta-aramids can be NOMEX. Although specific examples of aramids have been provided herein, other materials that have properties similar to these examples can also be used. Audio wires 904 configured to transmit sound from the jack 90 to the earbuds 10a and 10b can be positioned within the cables 80a and 80b. Exemplary audio wires 904 can include copper wires that can be surrounded by an insulating material 906, such as nylon silk. Using the teachings herein, one can manufacture a zipper earphone cable assembly 700 that withstands at least up to 15 kg of torque from end to end (earbud 10a to jack 90).

Once positioned as desired in the mold 702, the heated liquid material can be allowed into the mold 702 such that the allowed heated liquid material can surround the cables 80a and 80b and can fill the teeth shaped cavities 704a and 704b. After being allowed to set, the resulting assembly, as illustrated in FIG. 13, can include an excess mold material 706 that can be attached to the zipper teeth 40a and 40b bound to their respective cables 80a and 80b. As shown in FIGS. 13 and 14, the zipper teeth 40a and 40b can face outwards, away from each other, after the injection molding material has hardened. This excess mold material 706 can be sacrificial and can be removed by using a cutting tooling or by cutting by hand, as described with respect to FIG. 14. After the sacrificial molding 706 is removed, the remaining zipper teeth 40a and 40b can be disconnected/separate from each other and can be set on their respective cables 80a and 80b. As illustrated in FIG. 15, the zipper teeth 40a and 40b can easily be rotated 180 degrees such that the zipper teeth 40a and 40b face each other to zip together (as described with respect to FIG. 16) and zip-apart using a zipper slider 50 that is attached. In other implementations, the cavities of the zipper teeth can face each other in the mold and any excess molding can likewise be cut off. After installing the slider 50 onto the teeth 40a and 40b by using any suitable method, two upper stops can be placed at the top of the rows of teeth 40a and 40b to prevent the slider 50 from sliding off the top. As illustrated in FIG. 18, a stop 1010 can also be placed at the bottom of the two sets of teeth 40a and 40b and can be configured to prevent the zipper slider 50 from sliding off the bottom of the teeth. A decorative cover can be placed on the bottom stop 1010, if desired.

As illustrated in FIG. 17, multiple zipper units 708 can be set onto the same two cables 80a and 80b through the use of mass production using an assembly line of workers and/or tooling. More specifically, spools of cable 80a and 80b can be configured to run through the manufacturing steps described above. Sufficient cable spacing should be provided between the zipper units 708 to allow for attachment of the headphones, such as ear buds 10a and 10b, and a jack 90. Once the zipper unit 708 has been completed, the cables 80a and 80b can be cut at the desired length and additional parts such as the ear buds 10a and 10b, volume control 1000, and jack 90 can be installed using any suitable method of manufacturing.

In addition to standing alone, the zipper earphone assemblies, as described herein, can alternatively also be utilized directly with a clothing article, such as a zip-up jacket or sweatshirt. The zipper cabled assembly can be manufactured, as described herein, and can then be attached to the clothing article by sewing or other fastening means including hook and loop fasteners, clips, snaps, and the like. The audio jack can either be exposed at the bottom of the zipper or can be positioned within a pocket of the clothing article such that a user can attach the audio jack to a portable audio player. According to one implementation, both cables of a headphone assembly can have zipper teeth attached to them and can define a zipper of an article of clothing, such as a jacket or sweatshirt.

At a location above points 1004a and 1004b (and corresponding locations for other zipper cable assemblies), a releasing mechanism can be implemented. Using the releasing mechanism, a user can advantageously release/remove electronic (or other mechanical) components (for example, microphone, remote, ear buds, and the like) attached to the zipper earphone cable assembly (at least one of 100, 300, 400, 500, 600, and 700) from their clothing before washing and/or drying the clothing. In some implementations, the releasing mechanism is configured to be used by a user to release a zipper earphone cable assembly (at least one of 100, 300, 400, 500, 600, and 700) from an attached device (for example, clothing). Thus, the zipper earphone cable assembly (at least one of 100, 300, 400, 500, 600, and 700) can be removed/released from the clothing before washing and/or drying the clothing. The releasing mechanism can be an electronic mechanism or a mechanical mechanism. Examples of releasing mechanisms that can be used are a zipper, a hook, a latch, a snap, a pad-lock, a three-disc lock, a cam lock, a Norfolk latch, a Suffolk latch, a crossbar, a cabin hook, a bolt-lock latch, a compression latch, a draw latch, a rotary latch, a chain, magnetic lock, electric latch release, electronic code based release, and the like. The location above points 1004a and 1004b is advantageous, as this location can be close to other attached electronic components, such as microphone, remote, and the like. Further, location above points 1004a and 1004b can be more easily accessible by a user when the releasable mechanism needs to be used. Although location above points 1004a and 1004b is described, other locations such as any other point on the zipper earphone assembly (at least one of 100, 300, 400, 500, 600, and 700) can be used based on location of attached (attached to zipper earphone cable assembly) components, such as microphone, remote, ear buds and the like.

In some implementations, the ear buds and other parts can be water-proof, heat-resistant, and durable, such that those ear buds and other parts can be protected from water from a clothes washer and from heat from a dryer (for example, clothes dryer machine). According to some implementations, thermo-resistant thermoplastics such as polyacetals POM or polycarbonate (pc) and the like can be used for the casing, while a hydrophobic mesh or membrane can be used for venting. Herein, the term "thermo-resistant" can mean high heat thermo-moldable. That is, thermo-resistant materials can be materials that are resistant to (can bear) at least one of high temperature, high stress, high pressure, and other like strenuous conditions. Additionally, a high temperature resistant material, such as polyetherimide (PEI), polyether ether ketone (PEEK), and the like, can be used as a diaphragm material.

In some other implementations, the ear buds can be only water-proof and the clothing article can include instructions to avoid (or not) machine dry. Thus, a user can wash the clothing article with the incorporated water-proof ear buds, and then hang the washed clothing out to dry rather that subjecting the washed clothing to heat associated with the dryer (for example, clothes dryer machine).

FIG. 8 illustrates a perspective view of an earphone cable assembly 400 that utilizes magnets 250a and 250b as a releasable fastener in accordance with some implementations of the current subject matter. The earphone cable assembly 400 can be a non-zippered cable assembly, which is directed to the use of multiple small complementary magnets 250a and 250b spaced in intervals along the cables 80a and 80b that can allow the cables 80a and 80b to connect with each other and to release. Magnets 250a and 250b can be incorporated into an over-mold material 60a and 60b such that the magnets 250a and 250b extend out from the molding, positioned outside the over-mold material 60a and 60b or be used directly on the cables themselves.

Expandable Cable Management Systems

According to additional implementations, as illustrated by FIGS. 6a, 6b, 7a, 7b, and 7c, cable management systems can be used to prevent entanglement of additional type of cables. More specifically, FIGS. 6a, 6b, 7a, 7b, and 7c illustrate cable management systems that can compress and lengthen two or more wires. These assemblies can be useful to prevent entanglement of speaker wires, A/V wires, gaming wires, computer wires, and the like. These assemblies can also be used to baby-proof household wires and to otherwise prevent general disorganization of wires. Further, such cable management systems can be used with earphone wires.

FIGS. 6a and 6b illustrate a cable management assembly 500 that can expand to twice its compressed length, or substantially so. FIG. 6a illustrates the assembly 500 in a compressed state and having two internal channels 540a and 540b, wherein each channel can be configured to hold at least one wire 510a and 510b. Alternatively, the assembly can include one or more (for example, 1, 2, 3, 4, 5, or more) channels wherein each is configured to house at least 1, 2, 3, 4, 5, or more wires. A track 550 having means for releasable attachment can divide the two halves of the assembly 500. In one implementation, a zipper track can be used that can be opened and closed via zipper tab 50. Alternatively light magnets, or other releasable means can be used to divide the two halves of the assembly 500. The assembly can be made of a flexible material, such as rubber or fabric, so that the two halves can be folded upon each other and so that the two halves are capable of releasable attachment/coupling. FIG. 6b illustrates the assembly 500 in an expanded/longer configuration. When the means for releasable attachment are released (for example, when the zipper track is unzipped), the assembly 500 can be allowed to straighten out to be twice as long as the compressed configuration.

Figure 7C:
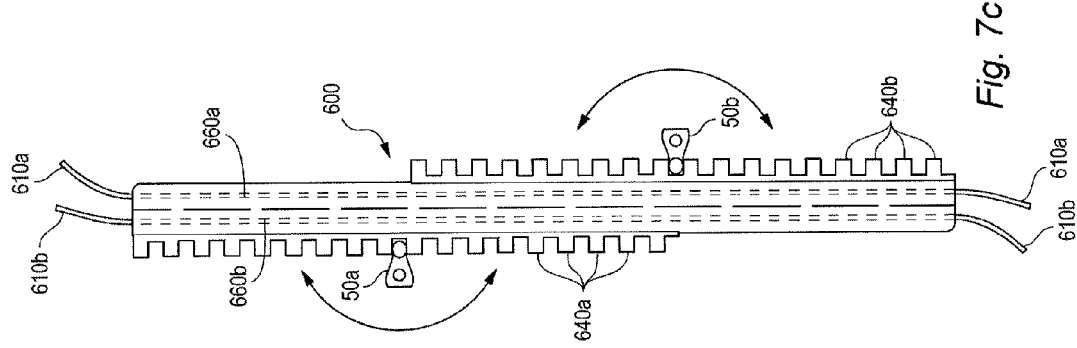
FIG. 7c illustrates a fully opened cable assembly that is expanded to three times the length of its closed configuration in accordance with some implementations of the current subject matter.
Figure 7B:
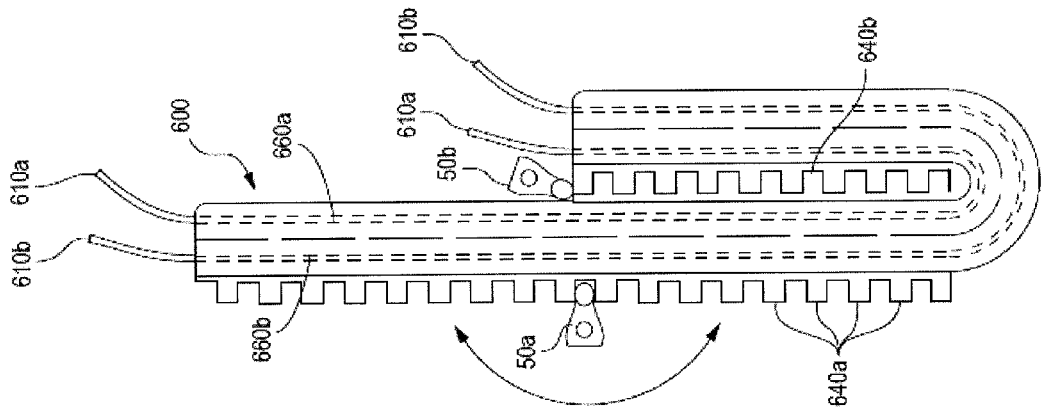
FIG. 7b illustrates a partially opened cable assembly in accordance with some implementations of the current subject matter.
Figure 7A:
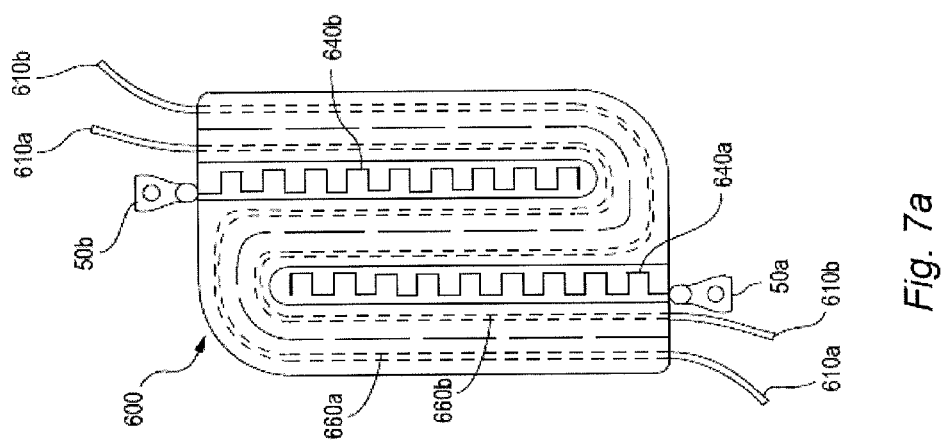
FIG. 7a illustrates a closed cable assembly that can open to three times its length in accordance with some implementations of the current subject matter.

Similarly, FIGS. 7a, 7b, and 7c illustrate a cable management assembly 600 that can expand to three times its size from a compressed form. FIG. 7a illustrates a compressed assembly 600 separated into three similarly or equally sized sections, wherein each section is divided by a track 640a and 640b having means for releasable attachment. More specifically the first track 640a can divide the first and second sections, while the second track 640b can divide the second and third sections of the assembly 600. As one implementation, zipper tracks can be used for the tracks 640a and 640b and can be opened and closed via zipper tabs 50a and 50b. Alternatively, light magnets, or other releasable means can be used to divide the three sections of the assembly 600. The assembly 600 can include two internal channels 660a and 660b, each of which are configured to hold at least 1 wire 610a and 610b. Alternatively, the assembly 600 can include one or more (for example, 1, 2, 3, 4, 5, or more) channels, wherein each channel can be configured to house at least 1, 2, 3, 4, 5, or more wires. The assembly 600 is preferably made of a flexible material such as rubber or fabric, such that the three sections can be folded upon each other as illustrated in FIGS. 7a and 7b and be capable of releasable attachment/coupling. FIG. 7b illustrates the assembly 600 in a semi-expanded, configuration, where the first section is released from the second section (track 640a is released), but the second section remains coupled to the third section (track 640b is closed). FIG. 7c illustrates the assembly 600 in a fully expanded configuration that is opened when the second track 640b is opened (for example, unzipped). The fully expanded configuration illustrated in FIG. 7c can be three times the length of the compressed configuration illustrated in FIG. 7a, or substantially so. The principals described above for assemblies 500 and 600 can be expanded to make even higher compressed cable management assemblies such as those that can be expanded to four times (4×), five times (5×), six times (6×), seven times (7×), eight times (8×), nine times (9×), ten times (10×), or even more-number times of their compressed length. These assemblies can also include side ribs to increase their flexibility.

Additional implementations can be directed to using fabric having one or more channels as an outer layer to cover the two or more wires for some implementations noted above. Fabric can be used for certain designs, as fabric can be very light weight and highly flexible. More specifically, a zipper backing material, such as AQUAGUARD® manufactured by YKK®, can be used to cover and manage wires utilizing the above implementations, depending on desired properties of the cable management assembly. This implementation can make it easier to incorporate a zipper as a means for releasable attachment between the two cables.

The cables 80a and 80b noted herein can be optimized for low microphonics, wherein microphonics is a phenomenon according to which mechanical vibrations are transformed to undesired electrical signal (noise). Low microphonics can be achieved/optimized by adding one or more elastomers and/or cotton-based dampening fibers intertwined with the cables 80a and 80b. The one or more elastomers and/or the intertwined cotton-based dampening fibers obviate additional pull of ears that can be caused due to heavy weight of other fibers used in conventional cables. Further, the one or more elastomers and/or the intertwined cotton-based dampening fibers associated with cables 80a and 80b enable cancelling maximum possible noise such that minimum noise (undesired sound) reaches ears of a user. Further, these cables are highly flexible and can be draped. Furthermore, these cables have/characterize a low direct-current (DC) resistance such that audio signal is minimally attenuated.

Although earphones with ear buds have been described herein, other implementations are also possible, such as circum-aural headphones (earphones including circular or ellipsoid earpads that encompass ears of a user), full size headphones, supra-aural headphones (earphones including pads that are positioned on top of ears of a user), open-back headphones, closed-back headphones, in-ear earphones (or canalphones, which can be inserted in the ear canal), a headphone with an attached microphone that can perform speech processing such as receiving speech signals, telephone headsets, cellular phone headsets, and the like. Further, although flexible wires have been described to be associated with ear-buds, rigid or semi-rigid material may be used to hold the buds or the like devices in a fixed orientation. In some implementations, the rigid/semi-rigid material can be iron, steel, plastic, and the like.

The current subject matter may be embodied in other specific forms besides and beyond those described herein. Further, the implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows described herein do not necessarily require the particular order shown, or sequential order, to achieve desirable results. Other implementations may be within the scope of the following claims.

The invention claimed is:

1. A method of forming a cable assembly, the method comprising:
   providing a first wire and a second wire that are enclosed by corresponding outer layers comprising a thermo-resistant material, the first wire and the second wire being configured to minimize noise associated with an audio signal transmitted through the first wire and the second wire; and
   releasably attaching the outer layers of the first wire and the second wire, such that the outer layers are capable of releasable attachment of the first wire with the second wire,
   wherein manufacturing of the cable assembly comprises rotating zipper teeth on the first wire and the second wire from an outward position to an inward position such that distal ends of the zipper teeth point inward after the rotation, the rotation allowing zippering together of the zipper teeth and zipping apart of the zipped zipper teeth.

2. The method of claim 1, wherein the first wire is enclosed by a first outer layer of the outer layers by injection molding and the second wire is enclosed by a second outer layer of the outer layers by injection molding.

3. The method of claim 2, wherein the first wire and the second wire are kept substantially straight during the injection molding while the tension force associated with the first wire and the second wire during the injection molding remains within a predetermined range.

4. The method of claim 3, wherein at least one of a tension meter and a load cell is used to determine the tension force.

5. The method of claim 3, wherein the predetermined range is based on a temperature associated with the injection molding.

6. The method of claim 1, further comprising:
   incorporating the cable assembly into an article of clothing, the cable assembly being associated with a jack; and
   positioning the jack within a pocket of the article of clothing.

7. A method of manufacturing an earphone cable assembly comprising at least two cables, the method comprising:
   holding the at least two cables substantially straight to avoid one or more kinks in the at least two manufactured cables;
   performing injection molding to inject zipper teeth on the at least two cables;
   removing excess molding from the injected zipper teeth; and
   rotating the zipper teeth from an outward position to an inward position such that distal ends of the zipper teeth point inward after the rotation, the rotation allowing zippering together of the zipper teeth and zipping apart of the zipped zipper teeth.

8. The method of claim 7, the distal ends characterizing respective portions of teeth are cut in order to remove the excess molding.

9. The method of claim 7, wherein:
   tension associated with the at least two cables that holds the at least two cables substantially straight is maintained below a threshold value, with the threshold value being dependent on a molding temperature associated with the injection molding; and
   the tension is measured by at least one of a tension meter and a load cell.

10. The method of claim 7, further comprising:
incorporating the earphone cable assembly into an article of clothing, wherein the first wire and the second wire are capable of being separated from at least the one or more headphones by using a releasing mechanism, the earphone cable assembly being associated with a jack; and
positioning the jack within a pocket of the article of clothing.

* * * * *